(12) United States Patent
Sharma

(10) Patent No.: US 6,766,163 B1
(45) Date of Patent: Jul. 20, 2004

(54) METHOD AND SYSTEM OF DISPLAYING TELETEXT INFORMATION ON MOBILE DEVICES

(75) Inventor: Dipanshu Sharma, Helsinki (FI)

(73) Assignee: Nokia Corpoaration, Espoo (FI)

(*) Notice: Subject to any disclaimer, the term of this patent is extended or adjusted under 35 U.S.C. 154(b) by 0 days.

(21) Appl. No.: 09/458,261

(22) Filed: Dec. 9, 1999

(51) Int. Cl.⁷ .............................................. H04M 11/10
(52) U.S. Cl. ................. 455/412.1; 455/552.1; 348/468; 348/478; 348/435.1
(58) Field of Search ............... 455/412.1, 3.01, 455/557, 552.1, 566, 552, 232, 455, 454.1, 414.4; 395/200.78; 382/232; 370/261; 348/432.1, 435.1, 473, 478, 460, 461, 468

(56) References Cited

U.S. PATENT DOCUMENTS

| | | | | |
|---|---|---|---|---|
| 4,931,870 A | * | 6/1990 | den Hollander | ............ 348/468 |
| 5,321,514 A | * | 6/1994 | Martinez | |
| 5,737,595 A | * | 4/1998 | Cohen et al. | |
| 5,909,184 A | * | 6/1999 | Tajima | |
| 5,974,180 A | * | 10/1999 | Schwendeman | |
| 5,974,238 A | * | 10/1999 | Chase, Jr. | |
| 6,117,013 A | * | 9/2000 | Eiba | |

FOREIGN PATENT DOCUMENTS

| | | |
|---|---|---|
| DE | 299 13 809 | 1/2000 |
| JP | 02194740 | 1/1990 |
| JP | 06233262 | 8/1994 |
| JP | 08292991 | 5/1996 |
| JP | 10174142 | 6/1998 |
| KR | 9408807 B1 * | 10/1991 |

OTHER PUBLICATIONS

PCT WO 99/12336 Kinghom, Teletext.*

* cited by examiner

Primary Examiner—Charles Appiah
Assistant Examiner—Nghi Ly (57) ABSTRACT

A communication system and method for communicating teletext information to mobile stations. A wireless access protocol (WAP) server is coupled to a television station and receives a signal which includes teletext information from the station. The WAP server includes a teletext decoder which decodes the teletext information in the transmitted signal. The decoded information is stored in memory using a server controller. The controller receives information requests from a network interface coupled to the mobile stations. The controller accesses the teletext information stored in memory and transmits the information to the mobile station through the network interface.

12 Claims, 8 Drawing Sheets

METHOD AND SYSTEM OF DISPLAYING TELETEXT INFORMATION ON MOBILE DEVICES

BACKGROUND OF THE INVENTION

1. Field of the Invention

The present invention relates to displaying information on wireless mobile devices. More particularly, the present invention relates to a teletext based system and method for requesting and accessing information on portable wireless devices.

2. Relevant Background

A desired feature for mobile wireless devices, such as cellular phones, beepers, and personal digital assistants (PDAs), is the ability to remotely access information using the mobile station's display and keypad. For example, wireless subscribers may want to check stock prices, receive travel information, or keep track of current news using their cellular phones. Although such information can currently be accessed to a degree on wireless devices using conventional techniques, several short comings in the prior art make these techniques less than optimal solutions for wireless devices.

One known system for accessing information through a wireless device, also referred to as a "mobile station" or simply a "mobile", is by means of a short message service (SMS). In a short message service, a short message entity (SME) sends a short message to a service center (SC). The service center then forwards the message to the mobile station, where it is displayed. In a specific configuration, the short message entity can be a news or information service that periodically delivers updated data to the mobile stations. By using a short message service in this manner, the mobile station can display brief descriptions of current news or other information.

One drawback of short message services is the relatively limited amount of information deliverable by each broadcast message. Generally, the maximum length of a short message is only 160 characters, with the character set predefined. In addition, short message services are not trusted systems, meaning there is no assurance that the received message is coming from a known reliable source.

Another drawback of short message services is the general inability of users to selectively choose topical information of interest to them and filter away information they consider unimportant. In addition, a short message service is typically not responsive to user feedback and must supply information to users on a prearranged schedule rather than a demand based schedule. Therefore, a short message service is typically only useful in providing periodic updates about specific and narrowly focused information.

Another known system for accessing information through a mobile station is by means of an Internet connection and Internet browser. By leveraging the vast amounts of information contained on the Internet, wireless service subscribers can access a wide variety of subjects through their mobile stations. One of the drawbacks of Internet service over wireless devices, however, is the difficulty in finding the information desired. Moreover, once information is found, the is no guarantee it is up-to-date and trustworthy.

Typically, browsing the Internet over a mobile station is also a very slow process. Connections to the Internet over wireless devices are often slow due to the lower bandwidth of wireless networks and added switching requirements. Downloading web pages over wireless devices, especially pages with large amounts of graphics, may therefore be too time consuming for many users.

Another drawback of accessing information using an Internet browser over a wireless device is the limited ability of compact mobile devices to interface with people. Modern day wireless devices are generally hand held and contain a small display and keypad. For example, a typical cell phone may have a tiny four by ten character liquid crystal display with sixteen gray levels and only a numeric keypad with up/down volume keys. Such compact mobile stations are capable of displaying only small amounts of text and once and only the most basic of graphical shapes. Internet web pages, however, are typically designed for standard computer monitors and contain text and graphics too detailed to be decipherable on many mobile station displays.

In addition, the small keypads of mobile stations make data entry more difficult and cumbersome than standard computer keyboards. Since finding information over the Internet typically requires relatively long data entry, such as when entering a web site's uniform resource locator (URL) or typing a descriptive search, using the tiny keypad of a mobile phone can become tedious and frustrating task, often requiring multiple key presses to enter each text character.

What is therefore needed is a better system for requesting and accessing information on portable wireless devices. Such a system should supply mobile stations with trusted and up-to-date information without requiring users to perform time consuming searches for the right data. What is also needed is a way to quickly access the information using the smaller displays and keypads of compact mobile devices.

SUMMARY OF THE INVENTION

Briefly stated, the present invention involves a communication system operable to communicate teletext information encoded in the vertical blanking interval of a television signal forming a data signal to a mobile station operable within a cellular network. The communication system includes a server and a cellular network infrastructure. The server includes at least one teletext decoder coupled to the data signal and operable to decode the teletext information. The server further includes a controller coupled to the teletext decoder, and a memory unit coupled to the controller and adapted to store the teletext information. A cellular network interface in the server is coupled to the controller and is adapted to receive and transmit network communications. The network infrastructure is coupled to the mobile station and is adapted to transmit the teletext information to the mobile station and receive information requests from the mobile station.

Another aspect of the invention is a method for communicating teletext information to a mobile station. A providing operation provides a data signal to a server, the data signal including a teletext message. A decoding operation decodes the teletext message provided during the providing operation at the server. A storing operation stores the teletext message decoded during the decoding operation in a server memory unit. A receiving operation receives a message request by the server from the mobile station. An accessing operation accesses the teletext message stored in the server memory during the storing operation according to the message request received during the receiving operation. A transmitting operation transmits the teletext message accessed during the accessing operation to the mobile station. A displaying operation displays the teletext message transmitted during the transmitting operation at the mobile station.

A further aspect of the invention is a server configured to communicate teletext information encoded in at least one data signal to a mobile station over a communication system. The server includes a teletext decoder coupled to the data signal, where the teletext decoder is configured to decode the teletext information in the at least one data signal. A controller is coupled to the teletext decoder, wherein the controller receives the teletext information from the teletext decoder. A memory unit is coupled to the controller such that the memory unit stores the teletext information. A network interface unit is also coupled to the controller and to the mobile station. The network interface unit receives requests from the mobile station and transmits the teletext information to the mobile station.

A further aspect of the invention is a mobile station configured to receive teletext information from a server over a communication system. The mobile station includes a teletext interface unit configured to receive the teletext information from the server, a controller coupled to the teletext interface, and a display unit coupled the controller. The controller is configured to format the teletext information and the display unit is configured to display the teletext information.

BRIEF DESCRIPTION OF THE DRAWINGS

FIG. 5A through FIG. 5E are illustrative examples of a wireless device's display screens using the present invention.

DETAILED DESCRIPTION OF THE INVENTION

Referring to the figures, like structures and elements shown throughout the figures are indicated with like reference numerals.

The present invention allows for transmission of news and other information to mobile stations in a wireless communication network, and for the selective display of the same on mobile stations. The invention takes advantage, in part, of teletext technology to convey information to multiple mobile stations. Teletext involves a method of displaying information on television sets by encoding text and graphical characters in the vertical blanking interval (VBI) of a television signal. Teletext service is a recognized and widely used system for displaying textual and simple graphical information on television monitors. For example, many television stations broadcast programs with teletext containing closed captioning to assist hearing impaired audiences. Teletext is also used in many airports, hotels, and other establishments which generally require distribution of frequently updated data. Teletext is discussed in greater detail below.

Figure 1:
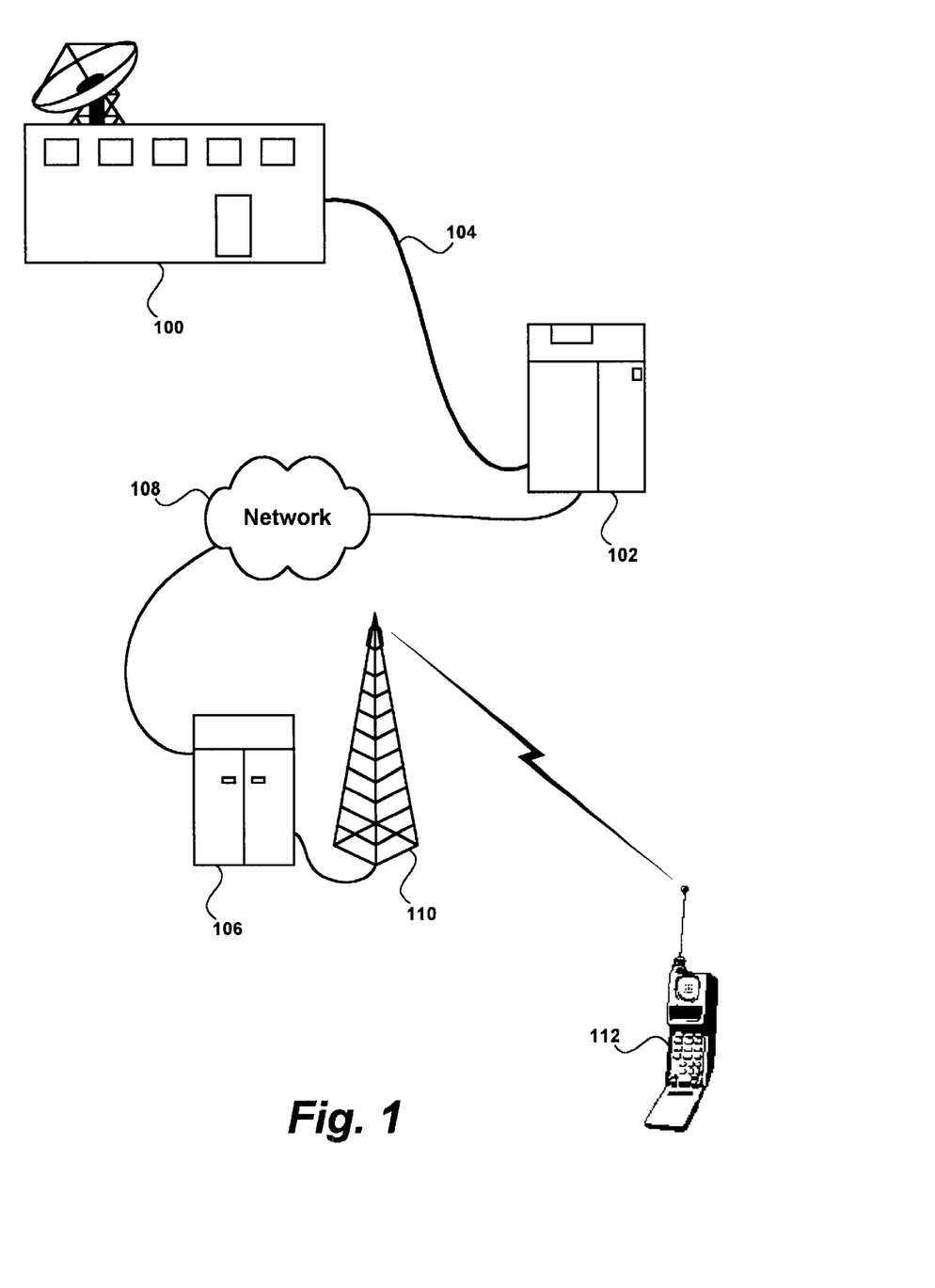
FIG. 1 shows a general overview of the present invention.

In FIG. 1, a general overview of the present invention is shown. A television station 100 encodes informational messages on its television data signal as teletext. As mentioned, the encoded messages may detail matters of interest to a variety of audiences, and may include news and current events, real-time financial data, travel and weather information, entertainment and dining information, retail advertising, and emergency/disaster information. In a preferred embodiment of the present invention, the television station 100 is a cable television station. It is contemplated, however, that other types of stations, such as digital satellite stations may be used.

The data signal is received by a Wireless Access Protocol (WAP) server 102 via a wire cable 104 or other communication means, such as an electromagnetic or optical link (not shown). The WAP server 102 is configured to decode the teletext messages encoded in the data signal and record the messages in memory. Thus, the WAP server is continuously updated with the contents of the most recent teletext messages.

In addition to receiving the television station signals, the WAP server 102 also communicates with a radio base station 106 through a cellular network 108. In one embodiment, the cellular network supports Global System for Mobile Communication (GSM) teleservices and utilizes a General Packet Radio Service (GPRS) transfer mode, however, other network configurations known in the art may be used and are considered within the scope of the present invention. The WAP server 102 sends portions of the teletext message to the base station 106 according to subscriber specified requests. The WAP server 102 can also "push" new information without a subscriber request to the base station 106 as updated teletext messages arrive from the television station 100. The base station 106 includes an antenna 110 which effectuates a radio link to a mobile station 112. The base station 106 transmits and receives data to and from a mobile station 112 via the radio link. In this manner, the teletext messages are transmitted and displayed on the mobile station's display screen, and are requested using the mobile station's keypad.

Figure 2:
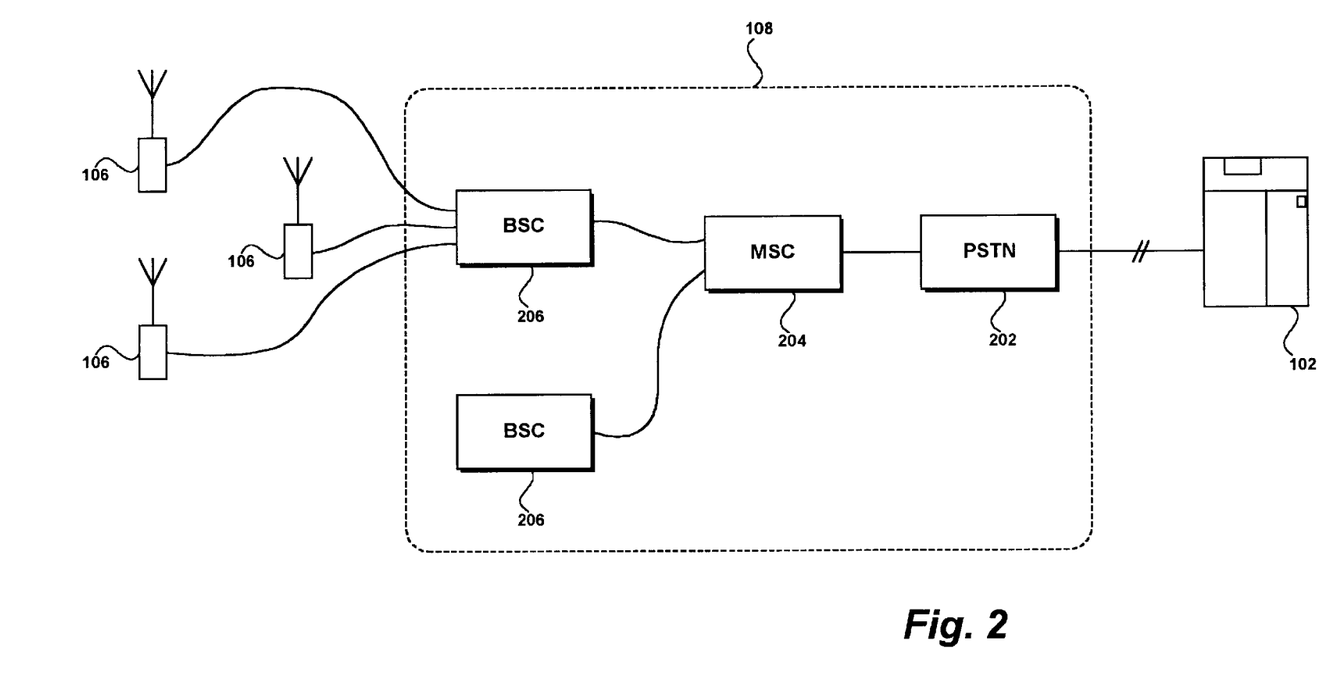
FIG. 2 shows an exemplary cellular network as contemplated by the present invention.

In FIG. 2, an exemplary cellular network 108 is shown. The WAP server 102 shown in FIG. 2 is coupled to a public-switched telephone network (PSTN) 202. The server 102 may communicate to the PSTN 202 directly, or by sending packet data to the PSTN 202 through an Internet backbone and network gateway (not shown). The PSTN 202 is coupled, in turn, to a mobile switching center (MSC) 204. The MSC 204 performs a variety of functions involved with call processing and switching operations for a group of base station controllers (BSCs) 206. Each BSC 206 is coupled to a group of base stations 106 and is operable to control the base stations coupled thereto. Telephonic communication is effectuated between, for instance, the mobile station 112 (see FIG. 1) and the WAP server 102 by way of the PSTN 202 and the network infrastructure including the MSC 204, the BSC 206, and the radio base station 106 to which the mobile station 112 is proximate by way of a radio link formed between the mobile station 112 and the base station 106.

In a particular embodiment, the teletext messages are formatted according to extensible Markup Language (XML) specifications and embedded within Wireless Session Protocol (WSP) packets. The XML message format is a useful format because it provides a standard grammar that is well understood. Moreover, the XML language is extensible, actively developed, and readily transportable through a variety of communications media using commonly available WSP transport mechanisms. Routers, switches, network ports, and other network devices are configurable to handle WSP formatted messages appropriately and reliably. It is contemplated that other formats and transport mechanisms may be useful in particular applications, such as formatting the teletext information according to the Wireless Markup Language (WML) or using proprietary transport protocols. These and other implementations are considered equivalent to the specific embodiments disclosed herein.

As discussed above, the present invention utilizes teletext technology to transfer messages between television stations and WAP servers. A teletext service takes advantage of the period of time an electron gun is turned off and is refocused from the bottom right corner of a cathode ray tube to the top left corner, known as the vertical blanking interval. A teletext service adds packets of text, graphics, and control characters to the video signal during the otherwise inactive vertical blanking interval.

A teletext decoder detects and decodes teletext messages added to television video signals at the vertical blanking interval. In conventional television sets equipped with a teletext decoder, the decoded teletext messages are displayed along with or in place of the video image received. Each screen of teletext data is considered a page, and pages are transmitted in turn, one page at a time. Typically, a television station repeatedly transmits a group of pages over and over again, and updates each page's contents as necessary. Multiple teletext pages are identified by page numbers, with the first page number typically starting at 100. The viewer selects which page to view by directing the decoder to display a particular page number. Thus, the viewer cannot specify which page is transmitted by a television station, only which page is displayed by the decoder.

The actual contents of a teletext message may include text, graphics, and control characters. Text characters comprise upper and lower case alphabet letters, numerals, punctuation marks, and symbols. Characters sets for a variety of languages are also available. Graphical characters are created by dividing a character rectangle into a two by three grid. Each of the six grid segments can be specified as either on or off, thus creating a customized character shape. By positioning graphical characters together, simple pictures can be formed. Control characters specify the color, location, and various other display attributes of text and graphics characters.

The present invention utilizes teletext technology to provide information displayed at wireless devices. A mobile device user can select a topic of interest by requesting a particular teletext page to be displayed. The present invention eliminates the need to key a long search request in a browser. By providing users with a menu of pages focused on a variety of topics, the user can simply select the pages of interest. Moreover, the information delivered is trusted since it is sent from known television stations. The textual and simple graphical format of teletext messages also makes the present system well suited for the small displays of mobile stations.

Figure 3:
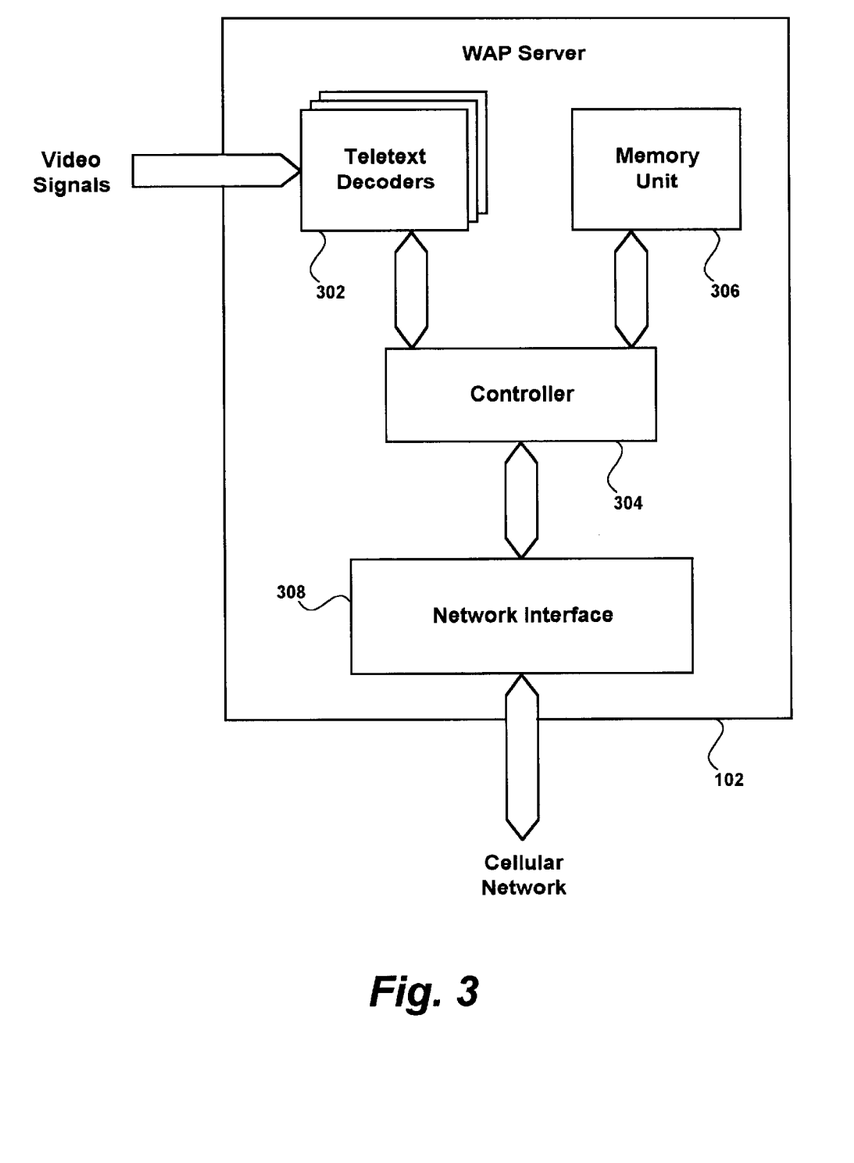
FIG. 3 shows a server as contemplated by the present invention.

In FIG. 3, the WAP server 102 as contemplated by the present invention is further detailed. The WAP server 102 includes a number of teletext decoders 302 which receive video signals from several television stations. It is contemplated that a number of television stations are used at once to deliver a greater variety of informational content to the end user. Teletext messages encoded in the video signals are captured by the teletext decoders 302 and passed to a controller 304, such as a state machine or central processing unit (CPU). The controller 304 records the teletext messages in a memory unit 306. The memory unit 306 may comprise, for example, random access memory (RAM), a magnetic disk, or a tape drive. As teletext messages are decoded by the teletext decoder 302, the controller 304 overwrites data stored in the memory unit 306 with the most recent teletext message received. In this manner, the memory unit 306 is continuously updated with the most recent teletext messages and the WAP server 102 contains a current copy of all the teletext pages provided by the various television stations. The WAP server 102 also includes a network interface 308 which carries out communications with mobile stations through a cellular network.

Figure 4:
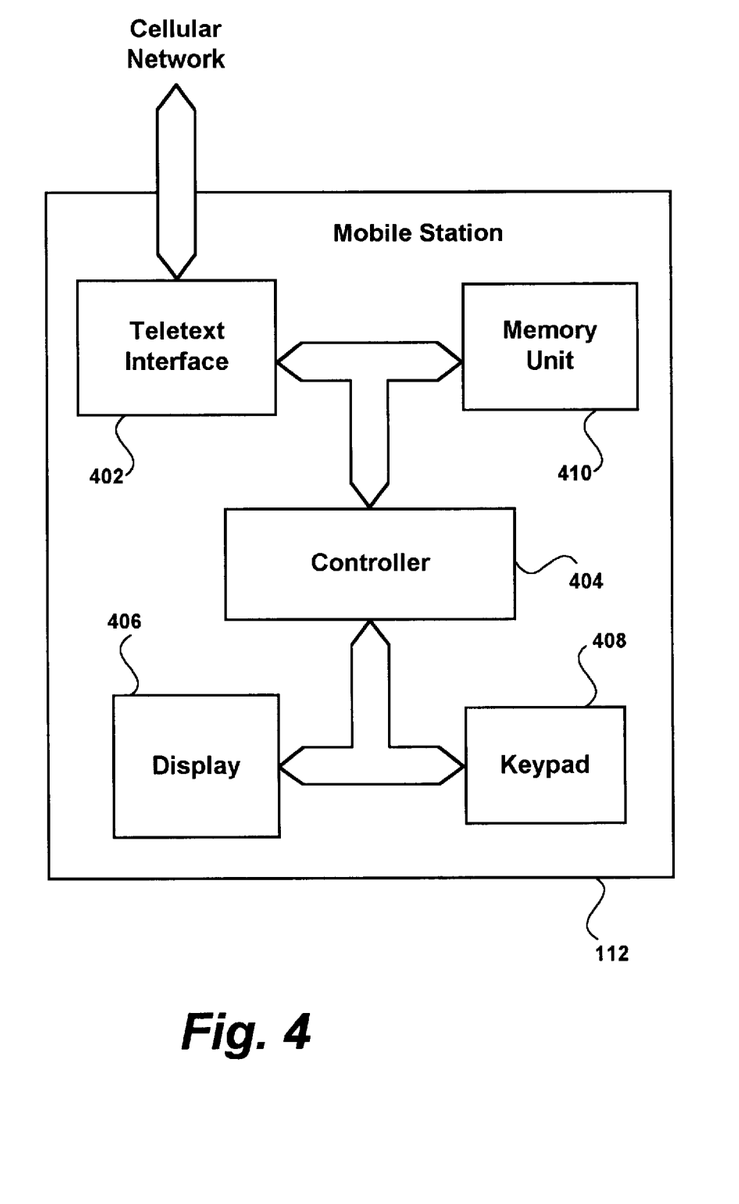
FIG. 4 shows a mobile station as contemplated by the present invention.

In FIG. 4, the mobile station 112 as contemplated by the present invention is further detailed. As shown, the mobile station 112 includes a teletext interface 402 which receives teletext messages from the cellular network. The teletext interface 402 passes the teletext messages to a controller 404, such as a CPU. The controller 404 formats the teletext messages according to any control characters in the message and displays the message on a screen display 406. The mobile station 112 also includes a keypad 408 used to select teletext pages stored at the WAP server. The controller 404 processes keypad entries and the teletext interface 402 requests the selected teletext pages from the WAP server. In addition, a memory unit 410 is used to create a historical listing of teletext pages viewed on the mobile station 112 so that previously viewed pages can be recalled.

Figure 5A:
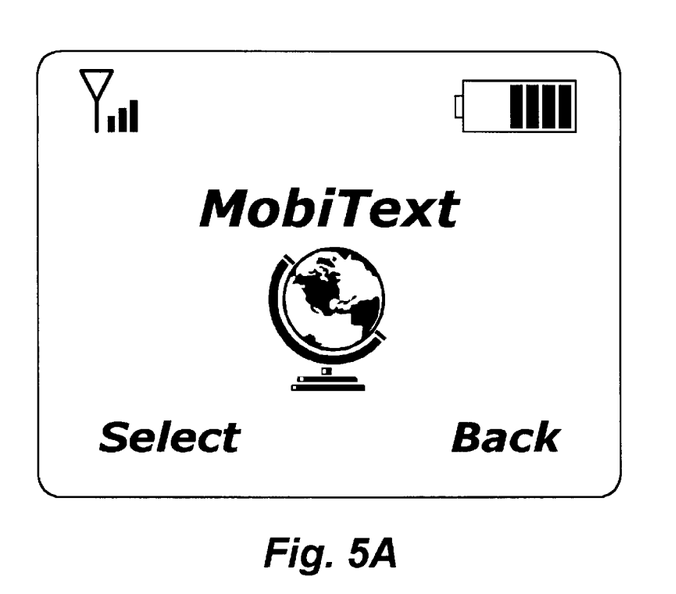

FIG. 5A through FIG. 5E are illustrative examples of a wireless device's display screens using the present invention. In FIG. 5A, the display is shown with an introductory screen allowing the user to select the information service of present invention, affectionately named "MobiText". The user may choose the MobiText option by keying the "Select" choice, or return to other menu options by keying the "Back" choice. It is contemplated that the MobiText option appears as a standard option on the mobile device.

Figure 5B:
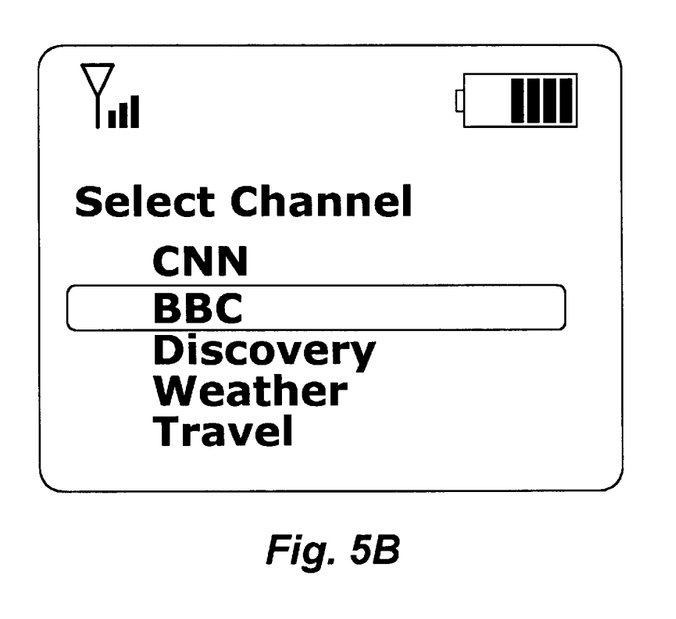

When the MobiText option is selected by the user, a list of available television channels providing teletext service to the mobile station is displayed, as shown in FIG. 5B. In one embodiment of the present invention, the list of available channels is stored in local memory at the mobile station. The list is dynamic, and each time new channels are added or removed at the WAP server, an updated channel list is communicated to the mobile stations. It is contemplated that service channels include both international and regional television stations. Regional stations can provide news, advertising, and other local information specific to the geographic location of the mobile station. Thus, many teletext WAP servers may be dispersed throughout the world, whereby each teletext WAP server services a particular geographic area. WAP servers may also be configured to communicate information with one another, providing users with access to a global listing of teletext service channels and offering information from all over the world. Additionally, channels listed may be customized to a particular group of mobile users, such as a listing of channels offering service in a particular language. After the list of teletext channels is shown to the user, and the user is able to select the channel desired. Selections are made by scrolling up and down the listed channels, or alternatively, by entering a number on the keypad corresponding to the selection choice.

Figure 5C:
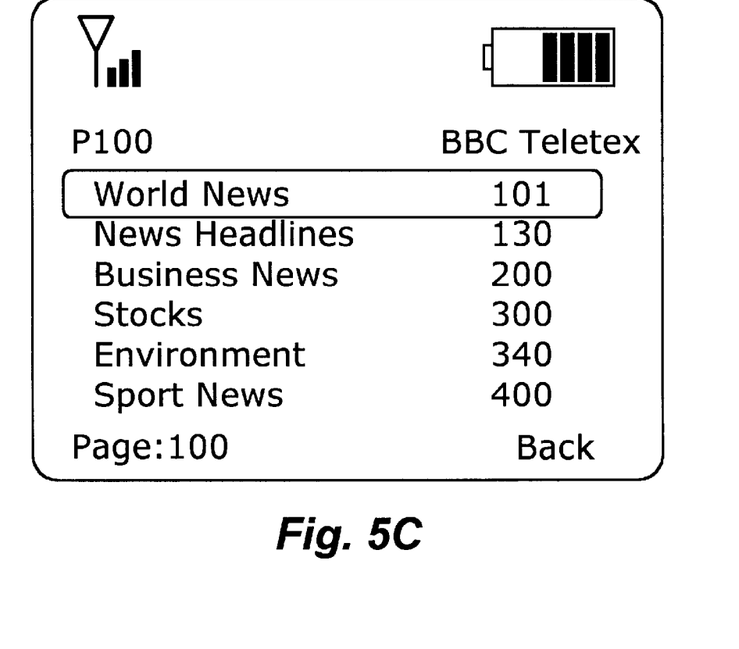

Once the user selects a channel, the mobile station relays the request to the WAP server. The WAP server responds by sending the first page (i.e. page 100) of the selected channel to the mobile device. It should be noted that only the page selected is delivered to the mobile station by the WAP server. In doing so, page download times are minimized. In FIG. 5C, the contents of a first page of a selected channel is shown. Preferably, the first page contains a menu of topics available on each of the various pages of the selected channel. Again, page selections are made by scrolling up and down, or alternatively, by directly entering a number corresponding to the page number chosen.

Figure 5D:
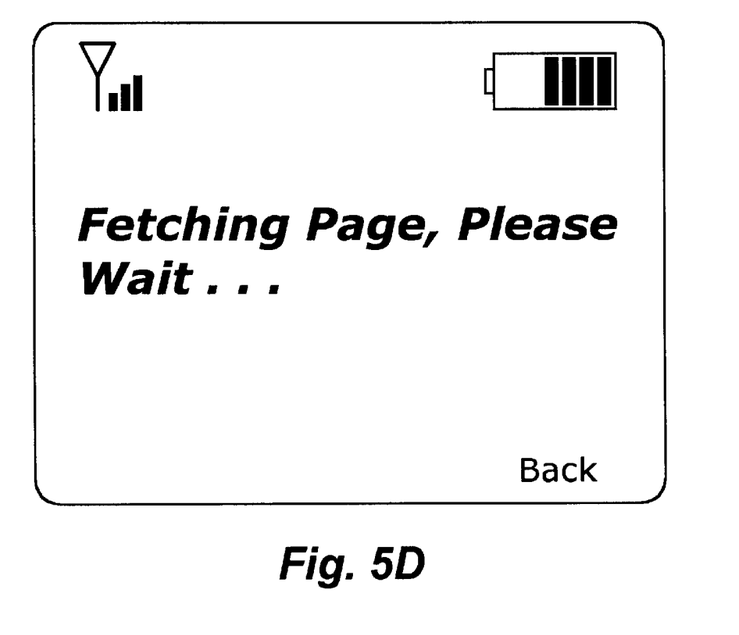

After a teletext page is selected, the mobile station informs the WAP server of the page number selected by means of the base station and cellular network as previously described. In response, the WAP server sends the mobile device the contents of the page requested. Specifically, the WAP server controller locates the information in memory using the channel and page number as an index. The information is then transferred to the WAP server's network interface where it is sent to the mobile station over the cellular network. In FIG. 5D, the user is informed that the page requested is being accessed by the WAP server.

Figure 5E:
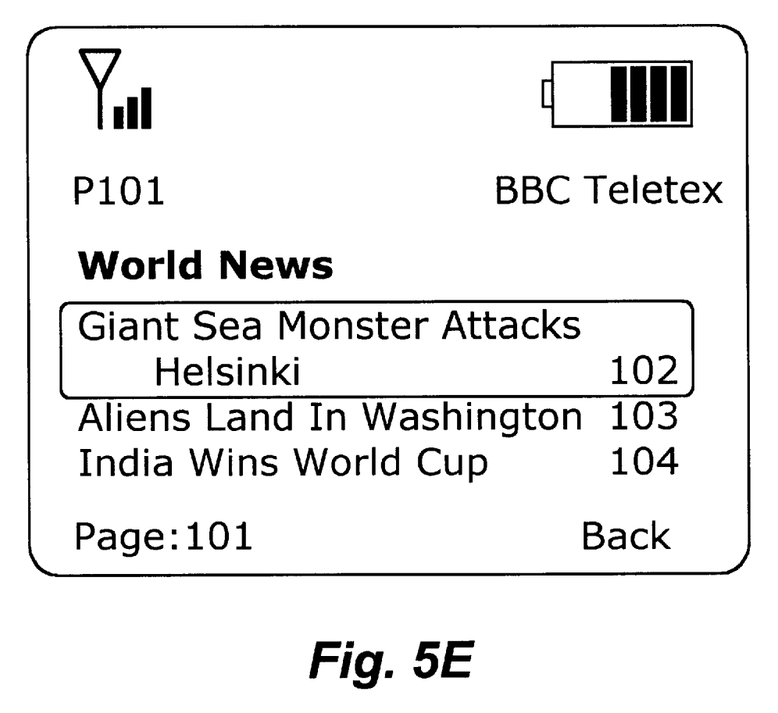

Once the page contents are received by the mobile station, they are displayed as shown in FIG. 5E. The information may contain further page choices that the user can select, or a final content message. To facilitate navigation of the teletext pages, the mobile station stores a historical listing of pages viewed by the user, and the user can use the "Back" option to return to previously viewed pages. The user can also skip to specific pages of interest by entering page numbers directly at any point.

In a particular embodiment, the mobile station may be configured to update page contents on a demand basis or a periodic basis. For example, in the demand based configuration, a user may choose to refresh a teletext page containing the latest score of a soccer match. Thus, the demand based configuration updates displayed information only when requested by the user. The periodic based configuration, on the other hand, allows the user to specify a time interval in which page contents are automatically updated. For example, the user may configure the mobile station to automatically fetch the latest soccer game scores every five minutes.

Figure 6:
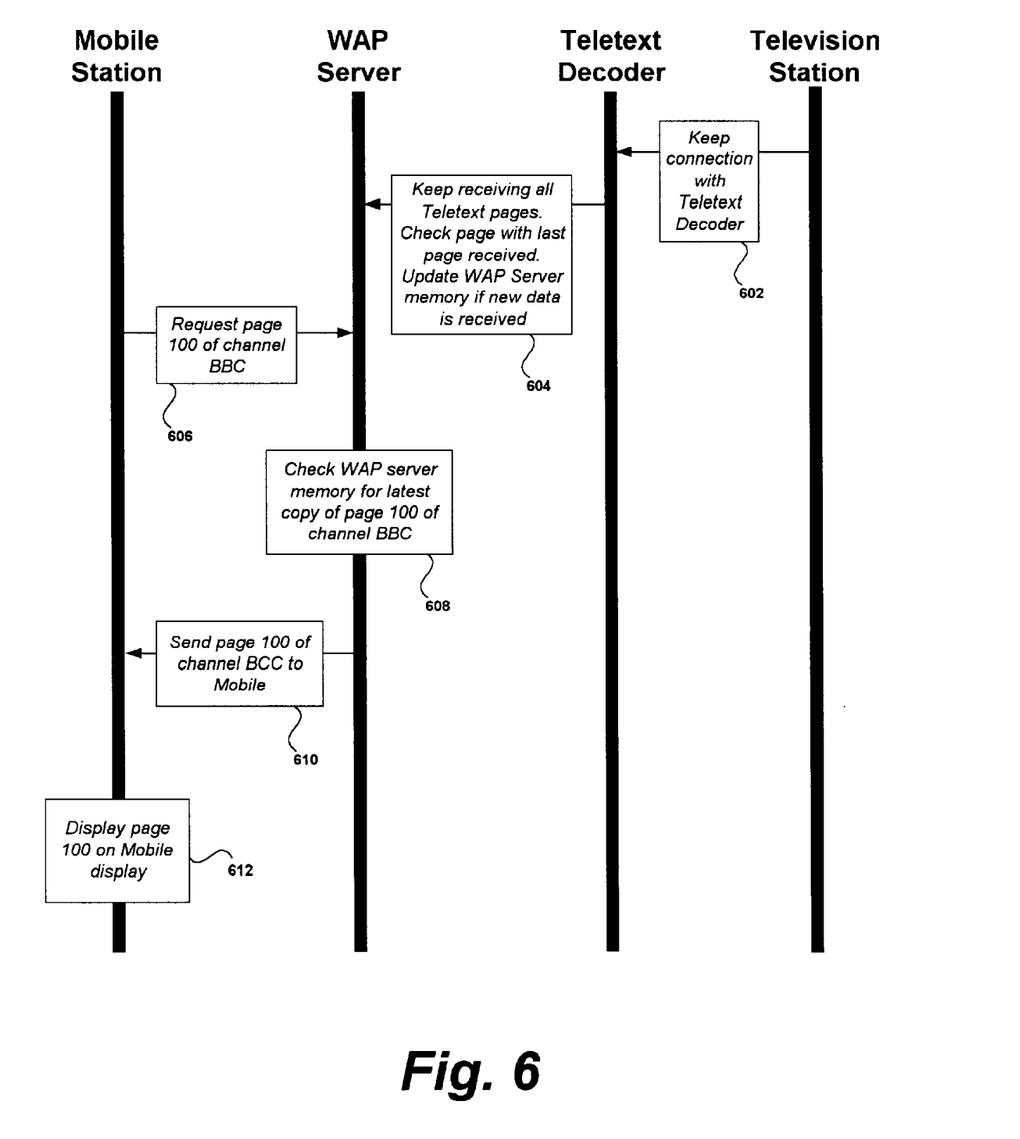
FIG. 6 shows an event sequence diagram illustrating a sequence of events leading to the display of a teletext page on a mobile station.

In FIG. 6, an event sequence diagram is shown illustrating a sequence of events leading to the display of page 100 of channel BBC on the mobile station. At event 602, a communication connection is maintained between a television station providing teletext service and the teletext decoder of the WAP server. The television station continuously cycles through the transmitted pages and the WAP server continuously updates these pages in the server memory, as described at event 604. At event 606, a teletext station and page number (BBC station and page 100) is selected by a mobile station, and the request is sent to the WAP server. The WAP server finds the most recent copy of the requested page in memory at event 608. At event 610, the contents of the page are then sent back to the mobile station. At event 612, the page contents are displayed at the mobile station. In the same way page 100 is fetched from the WAP server, page 101 and subsequent pages are also fetched.

While specific embodiments of the invention have been described, any equivalent function or device operating according to the principles of the invention falls within the scope thereof. It is therefore understood that the present disclosure has been made only by way of example, and that numerous changes, combinations and arrangements of techniques can be resorted to by those skilled in the art without departing from the spirit and scope of the invention, as hereinafter claimed.

The invention claimed is:

1. A communication system operable to communicate teletext information to a mobile station operable in a cellular communication network, the teletext information contained in a vertical blanking interval of at least one broadcast-station television signal, the system comprising:

a server including:
   at least one teletext decoder coupled to the at least one television signal and operable to continually decode the teletext information encoded within the vertical blanking interval of the at least one television signal;
   a controller coupled to the teletext decoder;
   formatting means for formatting the decoded teletext information such that it can be communicated to the mobile station via the cellular communication network;
   a memory unit coupled to the controller and adapted to store the decoded and formatted teletext information such that the stored teletext information is continually updated; and
a cellular network interface coupled to the controller and adapted to receive and transmit cellular network communications; and
a cellular network infrastructure coupled to the network interface and the mobile station, the cellular network infrastructure adapted to transmit the decoded teletext information to the mobile station and to receive information requests from the mobile station.

2. The communication system of claim 1, wherein the cellular communications network supports Global System for Mobile Communication (GSM) telecommunication services.

3. The communication system of claim 1, wherein transmitted teletext information from the network interface is formatted according to eXtensible Markup Language (XML) specifications.

4. The communication system of claim 1, wherein transmitted teletext information from the network interface is formatted according to Wireless Markup Language (WML) specifications.

5. The system of claim 1, further comprising a mobile-station memory unit coupled to the controller, wherein the mobile-station memory unit stores an historical listing of received teletext information.

6. The system of claim 1, wherein the controller is configured to update the teletext information on a periodic basis.

7. The mobile station of claim 6, wherein the periodic basis is determined by a mobile station user.

8. A method for communicating teletext information to a mobile station, the method comprising the operations of:

receiving in a server, a data signal formed of at least one broadcast-station television signal including a teletext message encoded within the vertical blanking interval thereof;

decoding the teletext message received during the receiving operation at the server;

formatting the decoded teletext message;

storing the decoded and formatted teletext message in a server memory unit such that at least the most current version of the teletext message is stored;

receiving a message request by the server from the mobile station;

accessing the most recent version of the decoded and formatted teletext message stored in the server memory during the storing operation according to the message request received during the receiving operation;

transmitting the decoded teletext message accessed during the accessing operation to the mobile station; and displaying at the mobile station the decoded teletext message transmitted during the transmitting operation.

9. The method of claim 8, wherein the transmitting operation further comprises transmitting the decoded and formatted teletext message over a cellular communications network.

10. The method of claim 8, further comprising the step of updating the server memory unit on a periodic basis.

11. A server configured to communicate current teletext information encoded in at least one broadcast-station television signal to a mobile station over a communication system, the server comprising:

a teletext decoder coupled to the at least one broadcast-station television signal and the teletext information encoded within a vertical blanking interval thereof, the teletext decoder configured to continually decode the teletext information in the at least one data signal;

a controller coupled to the teletext decoder, the controller receiving the teletext information from the teletext decoder;

a formatter for formatting the teletext information received from the teletext decoder;

a memory unit coupled to the controller, the memory unit storing at least the most current version of the decoded and formatted teletext information; and a network interface unit coupled to the controller, the network interface unit for receiving requests from the mobile station and transmitting the decoded and formatted teletext information to the mobile station.

12. The server of claim 11, wherein the communication system comprises a cellular communication system, and wherein the requests received by the network interface unit are generated during operation of the cellular communication system.

* * * * *